(12) United States Patent
Chételat

(10) Patent No.: US 12,433,501 B2
(45) Date of Patent: Oct. 7, 2025

(54) SENSOR CIRCUIT DEVICE FOR MEASURING A BIO-POTENTIAL OR A BIO-IMPEDANCE

(71) Applicant: CSEM Centre Suisse d'Electronique et de Microtechnique SA—Recherche et Développement, Neuchâtel (CH)

(72) Inventor: Olivier Chételat, Cudrefin (CH)

(73) Assignee: CSEM Centre Suisse d'Electronique et de Microtechnique SA—Recherche et Développement, Neuchatel (CH)

( * ) Notice: Subject to any disclaimer, the term of this patent is extended or adjusted under 35 U.S.C. 154(b) by 919 days.

(21) Appl. No.: 17/649,804

(22) Filed: Feb. 3, 2022

(65) Prior Publication Data

US 2022/0248975 A1    Aug. 11, 2022

(30) Foreign Application Priority Data

Feb. 8, 2021    (EP) .................................... 21155816

(51) Int. Cl.
| | | |
|---|---|---|
| *A61B 5/305* | (2021.01) | |
| *A61B 5/053* | (2021.01) | |
| *A61B 5/0531* | (2021.01) | |
| *A61B 5/308* | (2021.01) | |
| *G01R 27/26* | (2006.01) | |

(Continued)

(52) U.S. Cl.
CPC ............. *A61B 5/053* (2013.01); *A61B 5/0531* (2013.01); *A61B 5/305* (2021.01); *A61B 5/308* (2021.01); *G01R 27/26* (2013.01); *G01R 29/12* (2013.01); *H02J 50/001* (2020.01); *A61B 2560/0214* (2013.01); *A61B 2562/222* (2013.01)

(58) Field of Classification Search
CPC .......... A61B 5/305; A61B 5/308; A61B 5/053
See application file for complete search history.

(56) References Cited

U.S. PATENT DOCUMENTS 10,105,072 B2 *  10/2018  Chetelat ................. A61B 5/053

FOREIGN PATENT DOCUMENTS

| EP | 2294979 A1 | 3/2011 |
|---|---|---|
| EP | 2567657 A1 | 3/2013 |

(Continued)

OTHER PUBLICATIONS

Search Report issued in European Patent Application No. 21155816 dated May 28, 2021.

(Continued)

*Primary Examiner* — George R Evanisko
(74) *Attorney, Agent, or Firm* — McDonald Hopkins LLC

(57) ABSTRACT

Sensor circuit device for measuring a bio-potential and/or a bio-impedance of a body, including a master circuit, and at least two active bi-electrodes connected to, and remotely powered by, the master circuit via single-wire first connector. The sensor circuit device further includes a single passive current electrode being connected to the master circuit via single-wire second connector. The sensor circuit device cooperates with a biological signal amplifier configured to measure a bio-potential and/or a bio-impedance. Each active bi-electrode is connectable to the biological signal amplifier via the first connector, such that a bio-potential of the body is measurable between the two active bi-electrodes when the active bi-electrodes and the single current electrode are in contact with a surface of the body.

13 Claims, 7 Drawing Sheets

(51) Int. Cl.
  *G01R 29/12* (2006.01)
  *H02J 50/00* (2016.01)

(56) References Cited

FOREIGN PATENT DOCUMENTS

| EP | 2727528 A1 | 5/2014 |
| EP | 2886049 A1 | 6/2015 |
| EP | 3831289 A1 | 6/2021 |

OTHER PUBLICATIONS

Written Opinion issued in European Patent Application No. 21155816 dated May 28, 2021.
Sunyoung, Kim, et al.: "A 2.4 A continuous-time electrode-skin impedance measurement circuit for motion artifact monitoring in ECG acquisition systems", VLSI Circuits (VLSIC), 2010 IEEE Symposium On, Jun. 1, 2010, pp. 219-220, Piscataway, NJ, USA, XP055737524.
Metting Van Rijn, Coen, et al.: "High quality recording of bioelectric events. Part 1. Interference reduction, theory and practice", Medical & Biological Engineering & Computing, Oct. 1990.

\* cited by examiner

SENSOR CIRCUIT DEVICE FOR MEASURING A BIO-POTENTIAL OR A BIO-IMPEDANCE

TECHNICAL DOMAIN

The present disclosure concerns the field of electronic circuits for bio-potential and/or bio-impedance measurements. More particularly, the present disclosure concerns an electronic circuit for bio-potential and/or bio-impedance measurements that is simple and having low power consumption.

RELATED ART

Sensor circuit devices for measuring bio-potential and/or bio-impedance typically require driven-shielded wires and gel electrodes. For measuring bio-potentials, remotely powered active electrodes with two-wire cables can be used. Active electrodes are preferred as opposed to passive electrodes since the latter are usually gel or wetted electrodes while active electrodes can be dry electrodes. Moreover, wire shields are unnecessary with active electrodes.

FIG. 1 illustrates a sensor circuit device 200 for potential and/or impedance measurements on a body. The sensor circuit device 200 comprises a master circuit 100 configured to remotely power one or several first active bi-electrodes 34L, 34L'. Each first active bi-electrode 34L, 34L' is depicted by a "pass-through" symbol, since its purpose is to virtually bring a "direct" connection (i.e., a connection with low impedance) to the body, in contrast to usual electrode connections that include, for instance, the high impedance of the skin stratum corneum. Each first active bi-electrode 34L, 34L' is connected to the master circuit 100 via a first connector 102L, 102L', for instance an electrical wire. The sensor circuit device 200 further comprises a second active bi-electrode 134. In FIG. 1, the second active bi-electrode 134 is also depicted by a pass-through symbol. The second active bi-electrode 134 is connected to the master circuit 100 by second connector 102R. A voltage source 16 powers the first active bi-electrode 34L, 34L' with a high frequency voltage u (powering frequency band, typically about 1 MHz or greater). Capacitances 15, 15' allow a powering current to flow in the first connector 102L, 102L' while providing a high impedance in a bio-potential frequency band and/or a bio-impedance frequency band. In other words, the capacitance 15, 15' functions as low impedance at powering frequency band and as high impedance at bio-potential, bio-impedance, and d-signal band.

Note that the second active bi-electrode 134 is locally and therefore directly powered by the master circuit 100 while the first active bi-electrode 34L is remotely powered by voltage source 16 in the master circuit 100. In other words, the second active bi-electrode 134 is typically located in the master circuit 100 coming in contact with a surface 50 of a body 104 (for example the skin) while the first active bi-electrode 34L, 34L' is remote from the master circuit 100 and connected to, and powered by, the latter via the first connector 102L, 102L' and the body 104.

The master circuit 100 can be configured to measure a biopotential e of the body 104 (conductive tissues) from a measured voltage E across the master current source 40 (which can be absent for bio-potential measurement or, if present, with j=0 in bio-potential frequency band), when the first active bi-electrode 34L, 34L' and the second active bi-electrode 134 are in contact with the surface 50, and when the measured voltage E is in a bio-potential frequency band. Bio-impedance z can be measured as potential resulting from current j injected by the current source 40 in the bio-impedance frequency band, and hence as voltage E in the bio-impedance frequency band. The sensor circuit device 200 of FIG. 1 is described in more details in European patent application No. EP 20190213839 by the present applicant.

FIG. 2 shows a circuit of the locally powered second active bi-electrode 134. The circuit comprises a potential electrode 54 and a current electrode 51, both electrodes being destined to contact the surface 50. The circuit can further comprise an operational amplifier 60 powered by a power supply (not shown) of the master 100 and driving the current electrode 51 according to a voltage feedback measured at the potential electrode 54. The operational amplifier 60 can be modelled by a voltage source between the connector 102R and its output, this voltage source being controlled typically as a time-integral of the input voltage (voltage between + and −) of the operational amplifier.

FIG. 3 shows a possible configuration (circuit 101) of the remotely powered first active bi-electrode 34L, 34L'. The remotely powered active bi-electrode circuit 101 comprises a potential electrode 54 and a current electrode 51 destined to contact the surface 50. Resistances 63 and 64 provide a voltage divider between the positive and negative power-supply terminals of an operational amplifier 60. Two diodes 65 and 66 (or rectifier) together with energy-storage capacitances 61 and 62 fulfil the function of harvesting energy from the powering current circulating via the first connector 102L, 102L' and body 104, in a powering frequency band. The output of the operational amplifier 60 is connected to a common terminal of the two energy-storage capacitances 61 and 62 and to the current electrode 51. The operational amplifier 60 of the remotely powered first active bi-electrode 34L, 34L' works as in the locally powered second active electrode 134. The optional resistance 67 may help to stabilize the operational amplifier 60.

FIG. 4 illustrates a sensor circuit device 300 that is a variant of the sensor circuit device 200 of FIG. 1, wherein the locally powered second active bi-electrode 134 is replaced by a remotely powered second active bi-electrode 34R. The second active bi-electrode 34R can comprise the configuration of the remotely powered active bi-electrode circuit 101 shown in FIG. 3. The master circuit 100 comprises a master current source 40 configured to circulate a master current j in powering and bio-potential frequency bands via the first connector 102L, the second connector 102R and the current electrode 51 of the first and second active bi-electrodes 34L, 34R and the body 104, when the first and second active bi-electrodes 34L, 34R are in contact with a body surface 50. The first active bi-electrodes 34L, 34L' and second active bi-electrode 34R are remotely powered by harvesting energy from the master current j in the powering frequency band.

FIG. 5 illustrates a variant of the sensor circuit device 300 of FIG. 4, cooperating with conventional electronics, such as a biological signal amplifier 110, configured to measure bio-potential (voltage E) and bio-impedance (voltage E resulting from master current j). Such conventional biological signal amplifier is typically used in conjunction with gel electrodes. Here, the first and second active bi-electrodes 34L, 34L', 34R are remotely powered in series by the voltage source 16 in the master circuit 100. Thanks to the second active bi-electrode 34R, the voltage source 46 included in the conventional biological signal amplifier 110 may be optional (not necessarily needed). The bio-potential e of the body 104 can be measured across the current source 40 of the conventional biological signal amplifier 110 (voltage E) and when the measured voltage E is in a bio-potential frequency band (the current j of the current source 40 is zero in the bio-potential frequency band, meaning that the current source 40 may be absent in conventional biological signal amplifier 110 measuring only bio-potentials e). Bio-impedance z can be measured by voltage E resulting from the current injection of the current source 40, both in the bio-impedance frequency band. The sensor circuit device 300 of FIGS. 4 and 5 is described in more details in European patent application No. EP EP3831289 by the present applicant.

SUMMARY

The present disclosure concerns a sensor circuit device for measuring a bio-potential and/or a bio-impedance of a body. The sensor circuit device comprises a master circuit, at least two active bi-electrodes. Each active bi-electrode is connected to, and remotely powered by, the master circuit via a single-wire first connector. The master circuit comprises a master voltage supplying device and at least two impedance master circuits, each active bi-electrode being connected to a first terminal of the master voltage supplying device via the single-wire first connector and one of said at least two impedance master circuits. The sensor circuit device further comprises a single passive current electrode connected to a second terminal of the master voltage supplying device via a single-wire second connector. A biological signal amplifier is configured to measure a bio-potential and/or bio-impedance of the body between the two active bi-electrodes when each active bi-electrode are connected to the biological signal amplifier via the first connector, and when the active bi-electrodes and the single passive current electrode are in contact with a surface (50) of the body.

The sensor circuit device disclosed herein is simple and has low power consumption. Single-wire unshielded first connector can be used to connect the active bi-electrodes and single-wire unshielded second connector to connect the single current electrode to the master.

SHORT DESCRIPTION OF THE DRAWINGS

Exemplar embodiments of the invention are disclosed in the description and illustrated by the drawings in which.

EXAMPLES OF EMBODIMENTS

Figure 6:
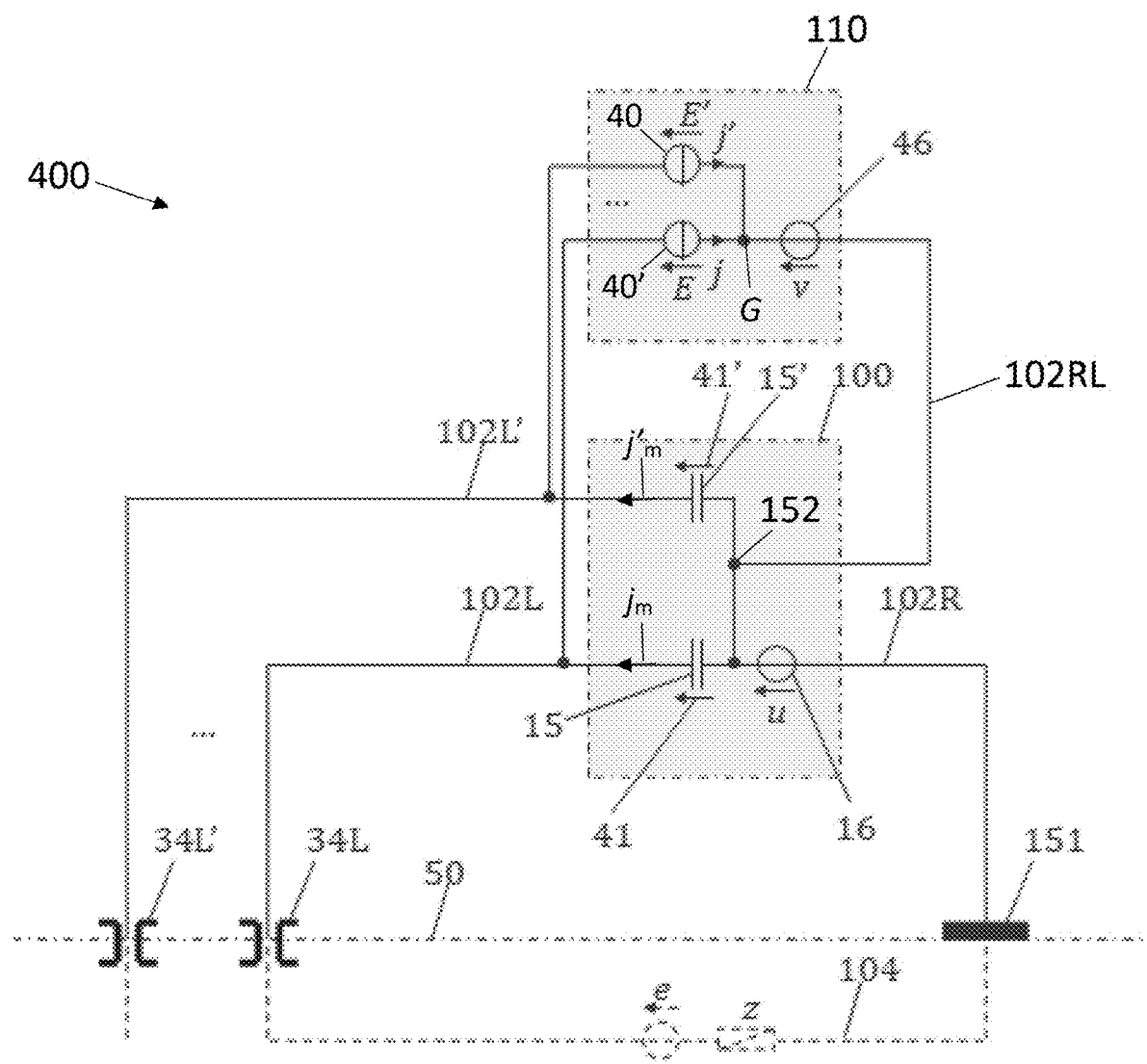
FIG. 6 shows a sensor circuit device for potential and/or impedance measurements on a body, according to an embodiment.

FIG. 6 shows a sensor circuit device 400 for bio-potential and/or bio-impedance measurements on a body 104, according to an embodiment. The sensor circuit device 400 comprises at least two active bi-electrodes 34L, 34L'. The active bi-electrode 34L, 34L' is represented by a "pass-through" symbol. The sensor circuit device 400 further comprises a single current electrode 151. The sensor circuit device 400 further comprises a master circuit 100 including a master voltage supplying device 16. Each active bi-electrode 34L, 34L' is connected to the master circuit 100 via a single-wire first connector 102L, 102L'. In particular, each active bi-electrode 34L, 34L' is connected to a first terminal of the master voltage source 16 via a impedance master circuit 15, 15'. The current electrode 151 is connected to a second terminal of the master voltage source 16 by a single-wire second connector 102R. The first connectors 102L, 102L' and the second connector 102R can be unshielded. In FIG. 6, the master voltage supplying device is represented as a voltage source, preferably a high-frequency voltage source. The impedance master circuit 15, 15' can comprise a capacitance. In the rest of the description, the impedance master circuit 15, 15' is denoted by a capacitance although it could comprise any other circuit functioning as the impedance master circuit.

A conventional active electrode has a buffer module between a surface 50 of a body 104 (for example the skin) and the electrode. This allows the electrode potential to be buffered, providing an alternative path for any disturbance current picked up by the electrode wire. As the disturbance current does no longer have to flow across the high impedance of the surface 50, the corresponding voltage disturbance can be avoided. However, a conventional active electrode requires at least a second wire to provide this alternative path.

Figure 1:
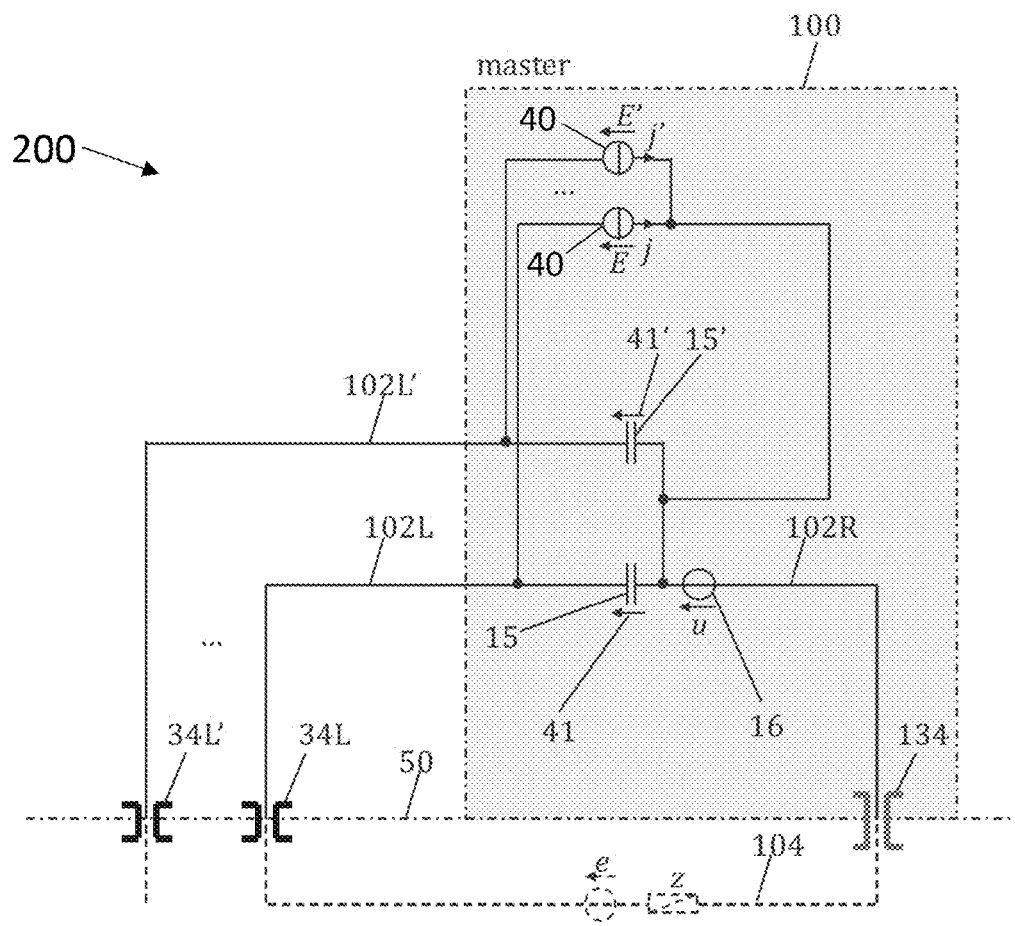
FIG. 1 illustrates a sensor circuit device for potential and/or impedance measurements on a body and comprising two first active bi-electrodes and a second active bi-electrode.
Figure 2:
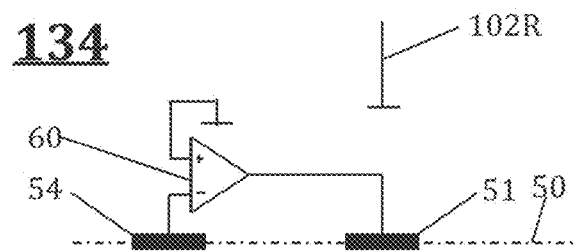
FIG. 2 shows a circuit of the locally powered second active bi-electrode.
Figure 3:
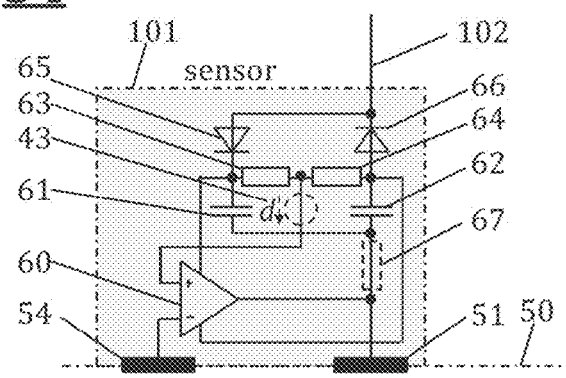
FIG. 3 shows an active bi-electrode circuit configuration of the first active bi-electrode.

The active bi-electrode 34L, 34L' does not require this second wire since the alternative path is provided by the current electrode 51. The active bi-electrode 34L, 34L' can comprise the configuration of the remotely powered active bi-electrode circuit 101 shown in FIG. 3.

The master voltage source 16 generates a high frequency voltage u in the powering frequency band, e.g., about 1 MHz or greater. The master capacitance 15, 15' allows a master powering current $j_m$, $j'_m$ to flow in the first connectors 102L and 102L'. The active bi-electrodes 34L, 34L' are remotely powered by harvesting energy from the master powering current $j_m$, $j'_m$ in a powering frequency band. The configuration of the sensor circuit device 400 does not require the master circuit 100 to contact a surface 50 of the body 104.

The master capacitances 15, 15' are further configured to provide a high impedance in a bio-potential frequency band and a bio-impedance frequency band. The bio-potential frequency band can be between, e.g., 0.05 Hz and 150 Hz and the bio-impedance frequency band can be between, e.g., 49.5 kHz and 50.5 kHz.

The sensor circuit device 400 is further configured to cooperate with a biological signal amplifier 110 configured to measure a bio-potential and/or a bio-impedance. The biological signal amplifier 110 can comprise a conventional signal amplifier such as described in Reference 1: M. R. Neuman, "Biopotential amplifiers," in Medical instrumentation: application and design, 4th ed., Hoboken, N.J.: John Wiley & Sons, 2010. Each active bi-electrode 34L, 34L' is connectable to the biological signal amplifier 110 via the first connector 102L, 102L', such that a bio-potential e and/or bio-impedance of the body 104 is measurable between the two active bi-electrodes 34L, 34L' when the active bi-electrodes 34L, 34L' and the single current electrode 151 are in contact with a surface 50 of the body 104.

In the example shown in FIG. 6, the biological signal amplifier 110 comprises a current source 40, 40' generating a signal amplifier current j, j' for the measurement of bio-impedance z and a feedback-controlled voltage source 46 driving the so-called right-leg, neutral, ground, guard, or current electrode.

A bio-potential e, e' of the body 104 can be measured at an active bi-electrode 34L and 34L' by measuring a signal amplifier voltage E, E' across the current source 40, 40', in the biological signal amplifier 110, when the active bi-electrodes 34L, 34L' and the current electrode 151 are in contact with the surface 50 (for example the skin). A bio-impedance z of the body 104 can be measured from the voltage E, E' resulting from the signal amplifier current j, j' of the current source 40, 40'. Note that for devices configured to measure only the bio-potential e, the current source 40 can be omitted (since j=0 in the bio-potential frequency band). The currents flowing across the current electrode 151 can comprise the powering current $j_m$, $j'_m$, the sum of the signal amplifier current j+j' of the current sources 40, 40', and/or any disturbance current captured from the electro-magnetic environment (e.g., 50 Hz).

The feedback-controlled voltage source 46 can be included in a driving circuit of right-leg electrode in order to reduce common-mode interference (see for example Reference 2: A. C. Metting van Rijn, A. Peper, and C. A. Grimbergen, "High-quality recording of bioelectric events: Part 1 Interference reduction, theory and practice," Med. Biol. Eng. Comput., vol. 28, no. 5, pp. 389-397, September 1990). Instead of being directly connected to a right-leg electrode, the device 110 can be connected to the master 100 which 'inserts' the master voltage source 16 in series to the current electrode 151 playing the role of right-leg electrode as far as bio-potential measurement is concerned. In particular, the master circuit 100 can comprise a right-leg connector 102RL connected to a common terminal 152 of the master capacitances 15, 15' and connectable to the feedback-controlled voltage source 46 such as to drive a right-leg electrode to reduce common-mode interference in the sensor circuit device 400.

In a preferred embodiment, the current electrode 151 is a passive electrode. A passive electrode is a direct contact with the surface 50, without any electronics, as is the case with active electrodes. A passive electrode simply extends the connection from the conductive material 151 to the master circuit 100 capturing, amplifying, or processing the potential signal picked up from the surface 50 by the active bi-electrodes 34L, 34L'. Its purpose is to provide a path for the powering current resulting from the voltage source 16, the sum of currents j and j' of the current sources 40, 40', and any disturbance current picked up, from the electromagnetic environment, by the master circuit 100, the equipment 110, and the second connector 102R. More preferably, the current electrode 151 is a dry electrode. The current electrode 151 can be made of a metal, an alloy, or silver/silver chloride (Ag—AgCl), with or without gel/liquid.

In one aspect, the active bi-electrode 34L, 34L' comprises a transfer voltage source 43 (see FIG. 3) configured to provide a transfer signal d (voltage). The signal amplifier voltage E can then be used as receiver for the transfer signal d transmitted by the voltage source 43, via the first connector 102L, 102L'. The transfer signals d can be transmitted at a transfer frequency band that differs from the bio-potential, bio-impedance, and powering frequency bands. For example, the transfer frequency band can be between 150 Hz and 49.5 kHz.

In one aspect, the signal amplifier voltage E can correspond to E=e+jz+d for the bio-potential e, bio-impedance voltage jz, or transfer signal d, where j is the signal amplifier current.

The transfer signal d can correspond to another signal than the bio-potential and bio-impedance signals. For example, the transfer signal d can be used to transfer signals provided from other sensors, in addition to the active electrode 34L, 34L'. For instance, the transfer signal d can correspond to a signal provided by an optical sensor, such as a sensor for photo-plethysmography (PPG), a temperature sensor, an acoustic sensor (e.g., stethoscope), a sensor for electro-dermal activity, an accelerometer, etc.

Figure 7:
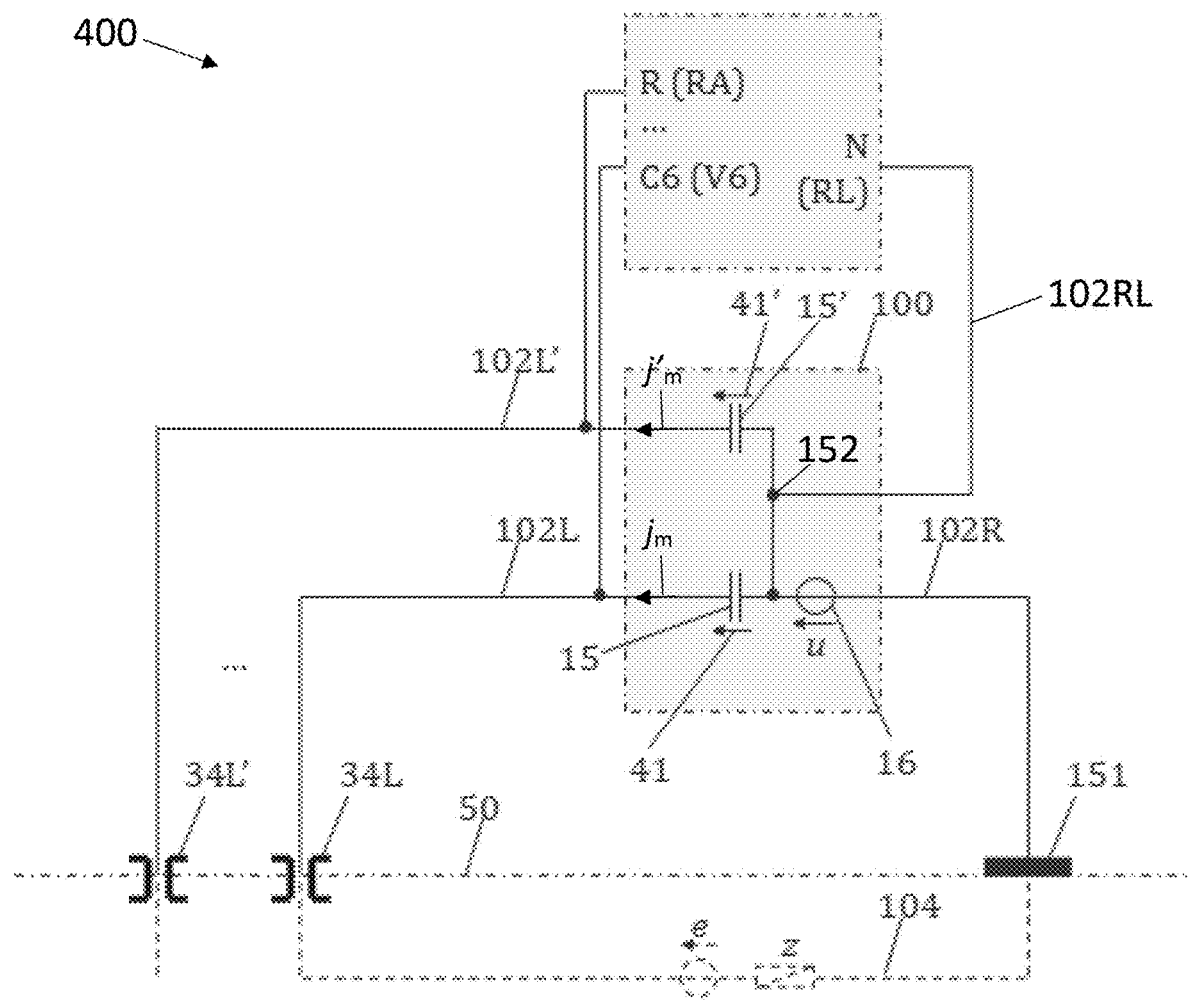
FIG. 7 shows a variant of the sensor circuit device of FIG. 6.

In a variant of the sensor circuit device 400 shown in FIG. 7, the biological signal amplifier 110 comprises an ECG amplifier. For example, the biological signal amplifier 110 can be configured to be used in a 12-lead ECG configuration, wherein the active bi-electrodes 34L, 34L' comprise a right arm, left arm, left leg and V1-V6 electrodes, all connected to the master circuit 100 via the first connector 102L, 102L' and connectable to the biological signal amplifier 110 via the first connector 102L, 102L'. The ECG amplifier can comprise a neutral electrode N connection (also called RL, i.e., right-leg electrode connection), here the right-leg connector 102RL, that can be connected to the common terminal 152 of the master capacitances 15, 15'. The right-leg connector 102RL can also be connected to the feedback-controlled voltage source 46 such as to reduce common-mode interference in the sensor circuit device 400.

In the sensor circuit device 400 shown in FIGS. 6 and 7, the master circuit 100 and the biological signal amplifier 110 have their own floating power supply, i.e., their respective ground is not connected. This allows the biological signal amplifier 110 to have its ground at the middle node (node G between the signal amplifier current source 40 and the feedback-controlled voltage source 46, see FIG. 6) to easily implement the feedback-controlled voltage source 46, current source 40, and voltage measurement E. Therefore, a power supply (not shown) of the master circuit 100 has its potentials offset by u. This is not an issue if the master circuit 100 is physically an add-on with its own battery to upgrade an existing biological signal amplifier 110. However, if one wants to upgrade a biological signal amplifier 110 with the sensor circuit device 400, it is more convenient to have a single power supply supplying power to the sensor circuit device 400 and to the biological signal amplifier 110 when connected to the sensor circuit device 400. There are many known ways to create a floating sub power supply from a main power supply. Any of them can therefore be used to upgrade a biological signal amplifier 110 with the sensor circuit device 400.

Figure 8:
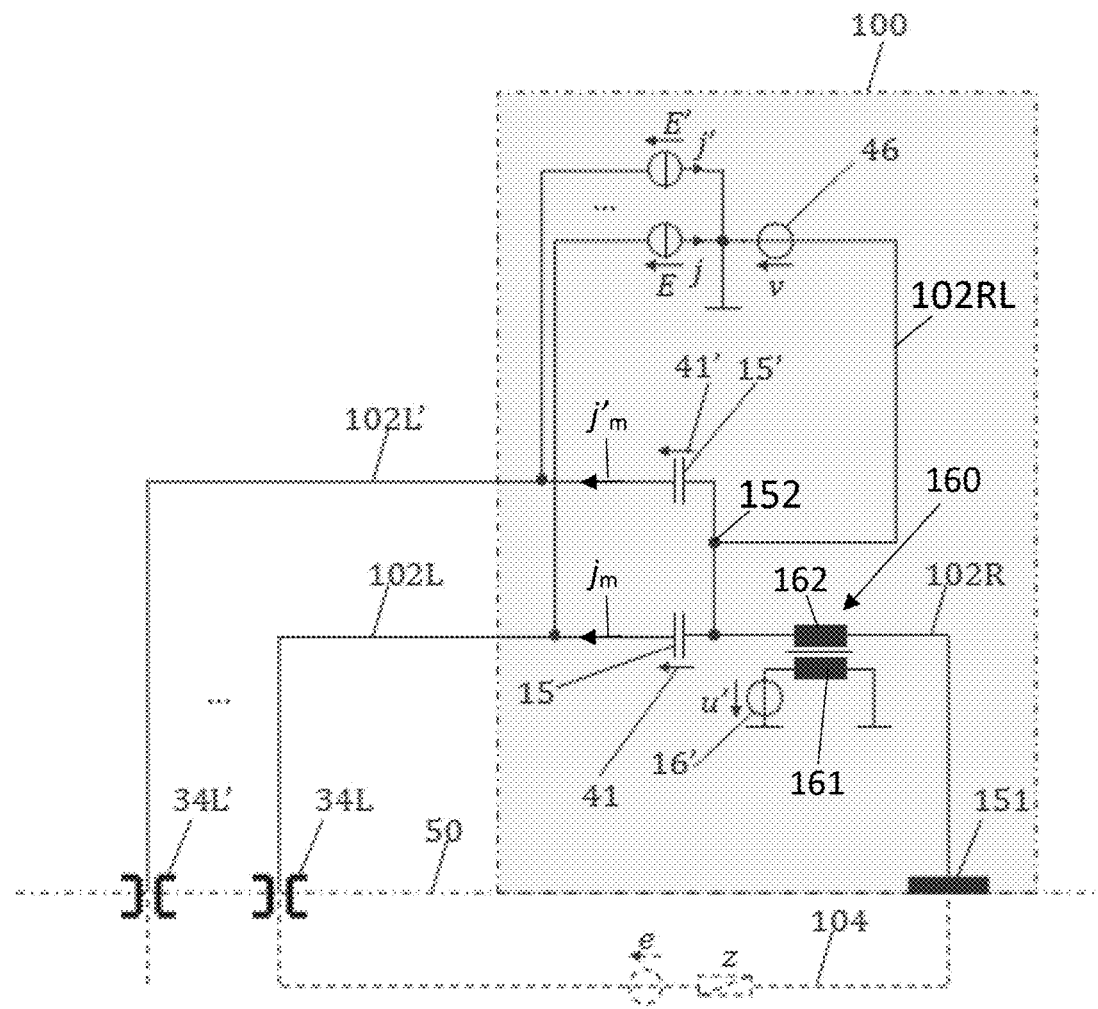
FIG. 8 shows a sensor circuit device, according to another embodiment.

In an embodiment of the sensor circuit device 400 shown in FIG. 8, the master voltage supplying device 16 comprises a transformer 160 including two electrically unconnected but magnetically coupled coils. A primary winding (coil) 161 is connected to a voltage source 16'. The voltage source 16' can be identical to the voltage source 16 of the sensor circuit device 400 shown in FIGS. 6 and 7 except that it is grounded. The secondary winding (coil) 162 of the transformer 160 behaves therefore as the voltage source 16.

Figure 9:
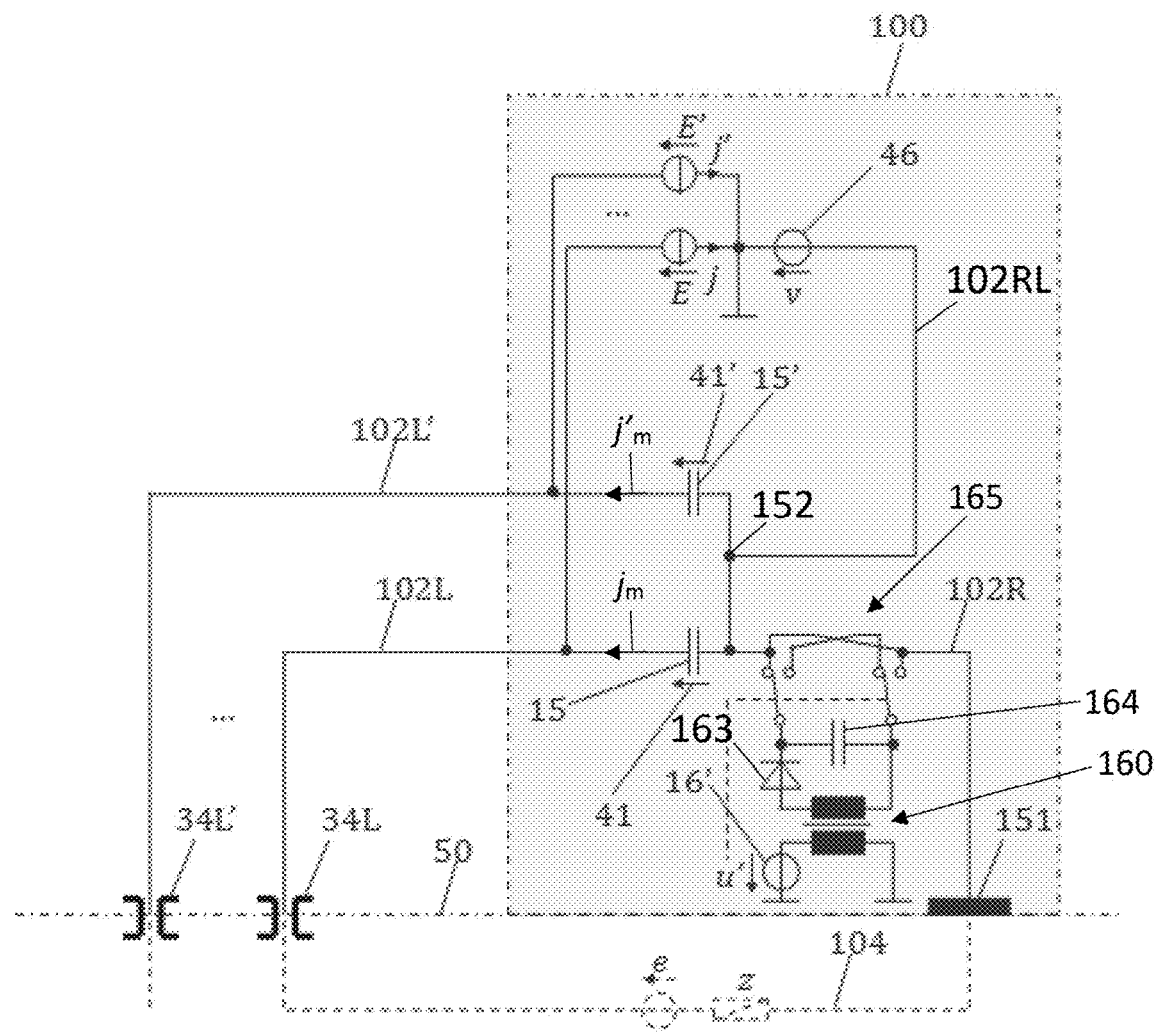
FIG. 9 shows a sensor circuit device, according to yet another embodiment.

The inductance of the transformer 160 may adversely affect the behavior of an existing design of the biological signal amplifier 110. FIG. 9 illustrates an alternative embodiment of the sensor circuit device 400 of FIG. 8. In this variant, the transformer 160 is configured to provide a high-frequency floating power supply. A diode 163 is provided to rectify the voltage of the secondary winding (coil) 162. A transformer capacitance 164 is provided to store the energy and a chopper 165 (i.e., electronic double switch that is used to interrupt one signal under the control of another) that alternatively and at high frequency connects the transformer capacitance 164 with opposite polarity to the common terminal 152 of capacitance 15, 15' and the second connector 102R in order to recreate the effect of the voltage source 16.

The sensor circuit device 400 disclosed herein allows for using a single-wire unshielded first connector 102L, 102L' to remotely power the active bi-electrode 34L, 34L'. Therefore, a wire that is cheaper, easier to connect, thinner, and more flexible that the shielded wire used in a conventional sensor circuit device can be used for connecting the first connector 102L, 102L', which is for instance more suitable for its integration in garments or wearables.

Moreover, the sensor circuit device 400 can be configured to cooperate with a conventional biological signal amplifier while using remotely powered active bi-electrodes 34L, 34L' and unshielded wire connector 102L, 102L', provided the addition of a simple add-on device 100 or circuit to upgrade classical bio-potential and/or bio-impedance electronics (i.e., device or circuit). The sensor-circuit device 400 allows for using dry active bi-electrodes 34L, 34L' and dry current electrode 151, instead of gel or wetted electrodes required by the conventional use of the biological signal amplifier 110 alone.

The sensor circuit device 400 does not requires the master circuit 100 to contact the surface 50 of the body 104 during measurement of the bio-potential and/or bio-impedance of the body 104.

Figure 4:
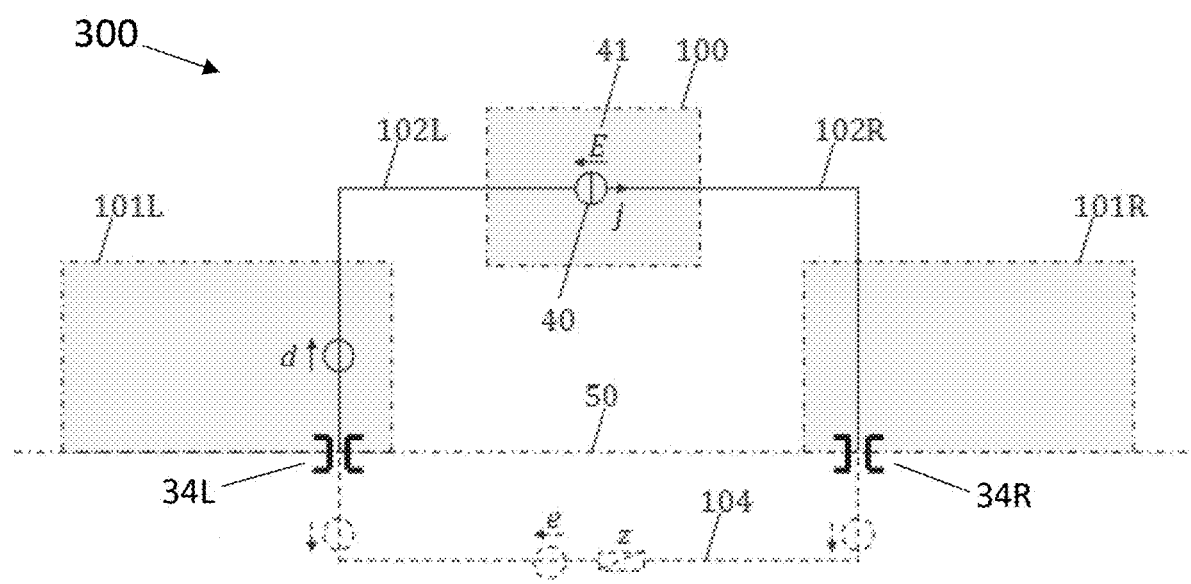
FIG. 4 illustrates a variant of the sensor circuit device of FIG. 1.
Figure 5:
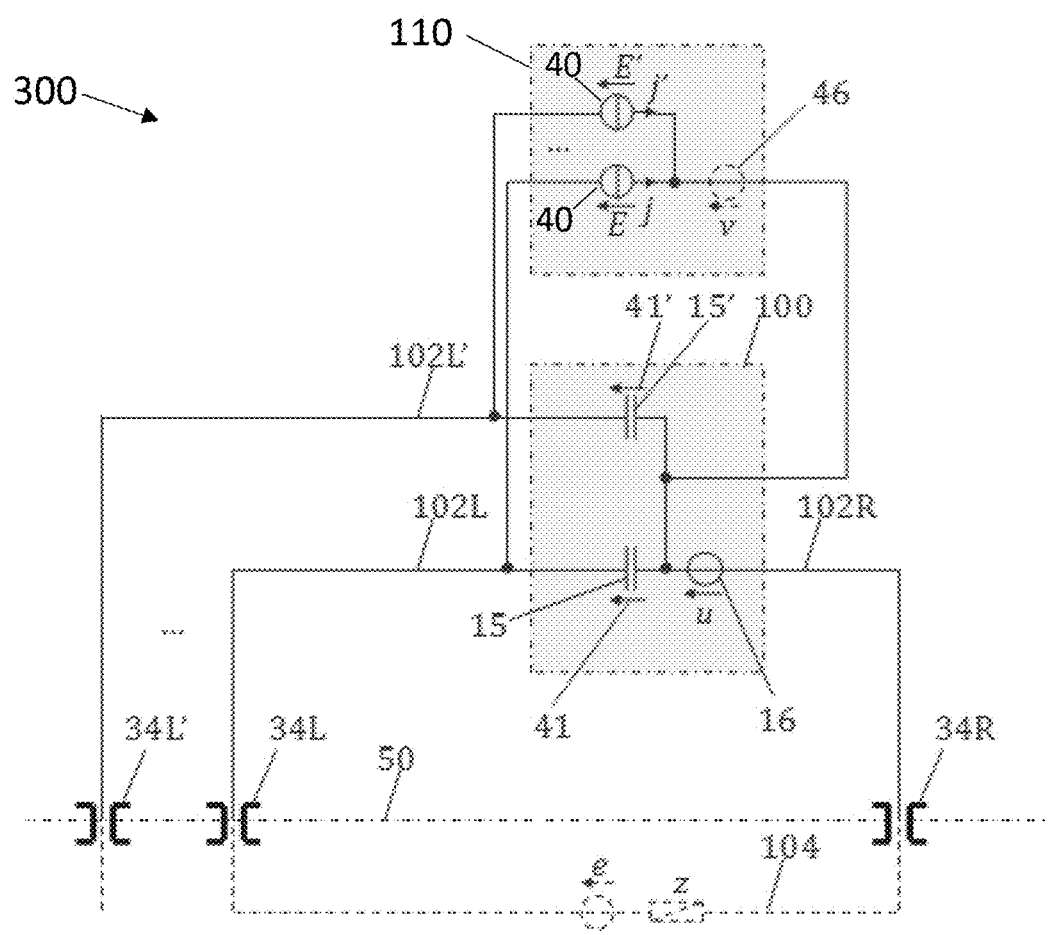
FIG. 5 illustrates a variant of the sensor circuit device of FIG. 4.

Moreover, the current electrode 151 (that can be a dry electrode) makes the sensor circuit device 400 to be simpler and save power consumption. This is in contrast to the sensor circuit device 300 of FIGS. 4 and 5, wherein the remotely powered second active bi-electrode 34R consumes the same power as the other remotely powered first active bi-electrodes 34L, 34L' since the second active bi-electrode 34R is crossed by the same sum of currents as the first active bi-electrodes 34L, 34L'. Moreover, the powering of the first active bi-electrodes 34L, 34L' and the second active bi-electrode 34R in series requires the voltage source 16 to have a voltage u twice as large (since the voltage u is split in two on both first and second active bi-electrodes 34L, 34L' and 34R).

The sensor circuit device 400 is adapted for measuring bio-potential, for instance, ECG (electrocardiogram), EEG (electroencephalogram), EMG (electromyogram), EOG (electrooculogram), etc., and/or to measure bio-impedance for instance, for measuring respiration rate and magnitude, BIS (bio-impedance spectroscopy, e.g., for body composition), EIT (electrical impedance tomography), etc.

REFERENCE NUMERAL USED IN THE FIGURES 100 master circuit
101 remotely powered active electrode circuit
102L, 102L' first connector
102R second connector
102RL right-leg connector
103 second active electrode circuit
104 body
110 biological signal amplifier
134 second active electrode
15, 15' impedance master circuit, master capacitance
151 current electrode
152 common terminal of the impedance master circuits
16 master voltage supplying device, master voltage source
16' grounded master voltage source
160 transformer
161 primary winding
162 secondary winding
163, 65, 66 diode
164 transformer capacitance
165 chopper
200 sensor circuit device
34L, 34L' first active bi-electrode, active bi-electrode
34R second active bi-electrode
300 sensor circuit device
40 signal amplifier current source
41, 41' powering current
43 transfer voltage source
46 feedback-controlled voltage source
400 sensor circuit device
50 surface, skin
51 current electrode
54 potential electrode
60 operational amplifier
61, 62 energy-storage capacitance
63, 64 resistance
d transfer signal
e bio-potential of the body
E signal amplifier voltage
j, j' signal amplifier current
$j_m$, $j_m'$ master powering current
G node
u high frequency voltage
z bio-impedance of the body

The invention claimed is:

1. Sensor circuit device for measuring a bio-potential and/or a bio-impedance of a body, comprising a master circuit;
at least two first connectors and a second connector, each of said at least two first connectors and the second connector comprising a single-wire;
at least two active bi-electrodes, each of the active bi-electrodes comprising a potential electrode and a current electrode and being connected to, and remotely powered by, the master circuit via a respective one of the first connectors; and
a biological signal amplifier connectable to each of the active bi-electrodes via the respective one of the first connectors;
wherein the master circuit comprises a master voltage supplying device, a first terminal, a second terminal, and at least two impedance master circuits, each of the active bi-electrode being connected to the first terminal via the respective one of the first connectors and one of said at least two impedance master circuits;
wherein the sensor circuit device further comprises a single passive current electrode connected to the second terminal via the second connector; and
wherein the biological signal amplifier is configured to measure a bio-potential and/or a bio-impedance of the body between each of said at least two active bi-electrodes when each of the active bi-electrodes are connected to the biological signal amplifier via the respective one of the first connector, and when the active bi-electrodes and the single passive current electrode are in contact with a surface of the body.

2. The sensor circuit device according to claim 1,
wherein each impedance master circuit is configured to provide a high impedance in a bio-potential frequency band and a bio-impedance frequency band, and a low impedance in a powering frequency band; and
wherein the master voltage supplying device is configured to power each of the active bi-electrodes with a high frequency voltage in the powering frequency band.

3. The sensor circuit device according to claim 2, wherein the powering frequency band is 1 MHz or greater.

4. The sensor circuit device according to claim 2, wherein the master voltage supplying device comprises a high-frequency voltage source.

5. The sensor circuit device according to claim 2, wherein the active bi-electrodes are configured to harvest energy from a master powering current flowing across the impedance master circuit in the powering frequency band.

6. The sensor circuit device according to claim 5, wherein each of the active bi-electrodes comprises energy-storage capacitances configured to harvest energy from the master powering current circulating via each of the first connectors in the powering frequency band.

7. The sensor circuit device according to claim 2, wherein the bio-potential frequency band is between 0.05 Hz and 150 Hz and the bio-impedance frequency band is between 49.5 kHz and 50.5 kHz.

8. The sensor circuit device according to claim 1,
wherein the biological signal amplifier comprises a feedback-controlled voltage source configured to drive a right-leg electrode to reduce common-mode interference; and
wherein the master circuit comprises a right-leg connector connected to a common terminal of the impedance master circuits and connectable to the feedback-controlled voltage source to reduce common-mode interference in the sensor circuit device.

9. The sensor circuit device according to claim 1, wherein the master voltage supplying device comprises a transformer configured to provide a high-frequency floating power supply.

10. The sensor circuit device according to claim 9,
wherein the master circuit comprises a master voltage source;
wherein the master voltage source is grounded; and
wherein the transformer includes a secondary winding and a primary winding, the primary winding being connected to the grounded master voltage source, the primary winding and secondary winding being unconnected.

11. The sensor circuit device according to claim 10,
wherein the master circuit further comprises a diode and a transformer capacitance; and
wherein the transformer is further connected to the diode configured to rectify with the transformer capacitance the voltage of the secondary winding.

12. The sensor circuit device according to claim 11,
wherein each of the impedance master circuit comprises a capacitance;
wherein the master circuit further comprises a chopper having an opposite polarity to a common terminal of the capacitance and the second connector; and
wherein the chopper is configured to connect alternatively the transformer capacitance with opposite polarity to the common terminal of capacitance and the second connector.

13. The sensor circuit device according to claim 1,
wherein the biological signal amplifier is an ECG amplifier configured to be used in a 12-lead ECG configuration;
wherein said at least two active bi-electrodes comprise a right arm, left arm, left leg and V1-V6 electrodes; and
wherein each of the right arm, left arm, left leg and V1-V6 electrodes is connected to the master circuit via the respective one of the first connectors.

* * * * *